US006966176B2

(12) United States Patent
Horn

(10) Patent No.: US 6,966,176 B2
(45) Date of Patent: Nov. 22, 2005

(54) SYSTEM AND FABRICATION METHOD FOR ACTIVELY COOLING HIGH PERFORMANCE COMPONENTS

(75) Inventor: Mark D. Horn, Granada Hills, CA (US)

(73) Assignee: The Boeing Company, Chicago, IL (US)

(*) Notice: Subject to any disclaimer, the term of this patent is extended or adjusted under 35 U.S.C. 154(b) by 92 days.

(21) Appl. No.: 10/726,953

(22) Filed: Dec. 3, 2003

(65) Prior Publication Data

US 2005/0120704 A1 Jun. 9, 2005

(51) Int. Cl.[7] .................................................. F02K 9/64
(52) U.S. Cl. ....................................................... 60/267
(58) Field of Search .................... 165/169; 60/266, 60/267; 239/127.1, 132.3; 29/890.01

(56) References Cited

U.S. PATENT DOCUMENTS

| 2,466,676 | A | * | 4/1949 | Boling et al. .................. 62/399 |
| 3,099,909 | A | * | 8/1963 | Newcomb ................ 239/127.1 |
| 3,120,101 | A | * | 2/1964 | Baehr ........................... 138/44 |
| 3,182,451 | A | * | 5/1965 | Messerly ................... 60/39.47 |

* cited by examiner

*Primary Examiner*—Ehud Gartenberg
(74) *Attorney, Agent, or Firm*—Merchant & Gould

(57) ABSTRACT

The present invention is directed toward a coolant system and method for fabricating a coolant system for actively cooling high performance components utilizing a plurality of feed channels that receive coolant from a manifold through coolant feed tubes and supply coolant to a liner that contains a plurality of coolant channels, each feed channel intersecting and distributing coolant to multiple coolant channels, wherein each coolant channel receives coolant from multiple feed channels.

20 Claims, 5 Drawing Sheets

SYSTEM AND FABRICATION METHOD FOR ACTIVELY COOLING HIGH PERFORMANCE COMPONENTS

TECHNICAL FIELD

This application generally relates to providing a system for actively cooling structures such as rocket engine components and a method for fabricating the system, with a plurality of feed channels that receive coolant from a manifold through coolant feed tubes and supply coolant to a liner that contains a plurality of coolant channels, each feed channel intersecting the plurality of coolant channels.

BACKGROUND OF THE INVENTION

Many rocket engine components must be actively cooled. Typically, this cooling is achieved by bonding a channeled liner to the surfaces that must be cooled. Coolant is distributed to and from the liner using manifolds and coolant channel feeds that are located in a backup structure and then bonded to the liner. There are two primary configurations for the channel feeds, both of which have shortcomings. The first method of supplying coolant to the coolant channels involves drilling individual feed passages to feed each coolant channel independently. This method often requires fabrication of an additional intermediate manifold disposed between the primary manifold and the discrete feed passages. There are several drawbacks to using this approach including increased fabrication time and costs, undesirable overall coolant pressure drops, additional machining and bonding steps in the fabrication cycle, precision manufacturing requirements, and blockage susceptibility.

The second method of supplying coolant to the coolant channels in the liner is to use a contiguous channel across all of the coolant channels such that this one feed channel supplies all of the coolant channels with coolant. By using this method, larger and fewer coolant feed tubes can be drilled from the manifold to the feed channel. This approach significantly reduces fabrication costs from the discrete feed passage approach, however, it has limited applicability. The single feed channel results in a contiguous unsupported span in the liner where it is unbonded to the backup structure. This configuration is structurally unacceptable for many high performance cooled products where high-pressure coolants are required. The contiguous unsupported span can limit liner life and result in significant liner deformation during the process of bonding the liner to the backup structure. These two methods of supplying coolant to the coolant channels and their drawbacks will be discussed in detail below in the "General Description" section of this application with reference to FIGS. 1A–2B.

Therefore, in light of the above, there is need in the art for a system and fabrication method for actively cooling high performance components with low cost and high reliability.

SUMMARY OF THE INVENTION

Embodiments of the present invention solve the above problems by providing a coolant system and method for fabricating a coolant system that allows for a simplified, cost-effective fabrication process while maintaining the structural integrity of the coolant system necessary for actively cooling high performance components. In one embodiment of the present invention, a coolant casing houses a plurality of coolant channels, a plurality of feed channels, and a coolant manifold. The feed channels intersect the coolant channels to allow coolant to flow from each feed channel into all of the coolant channels. The coolant manifold feeds coolant to the feed channels through coolant feed tubes that extend from the manifold and intersect the feed channels. Each feed tube delivers coolant to all of the feed channels, which in turn feed all of the coolant channels.

Another embodiment of the present invention provides a coolant system including a liner and a backup structure, which together form a casing. The liner contains a plurality of coolant channels. The backup structure contains a plurality of parallel feed channels, wherein each of the feed channels intersects the plurality of coolant channels when the backup structure is bonded to the liner. Further, the backup structure includes a coolant manifold and a plurality of coolant feed tubes. The coolant feed tubes extend from the coolant manifold such that they intersect the plurality of feed channels. The coolant flows from the manifold, through the coolant feed tubes, to the plurality of feed channels, where it is distributed to the coolant channels.

Yet another embodiment of the present invention provides a method for fabricating a coolant system. A liner is manufactured to comprise a plurality of coolant channels. The coolant channels may be milled into the liner using techniques commonly recognized in the art. A backup structure is manufactured to comprise a first coolant manifold segment, a plurality of coolant feed tubes, and a plurality of feed channels. The first coolant segment is machined into a first side of the backup structure. The plurality of coolant feed tubes are machined such that a first end of each of the coolant feed tubes opens into the first coolant manifold segment and a second end of each of the coolant feed tubes extends through the backup structure toward a second side of the backup structure. The plurality of feed channels are machined into the second side of the backup structure such that the feed channels intersect the second ends of the coolant feed tubes. A second coolant manifold segment is bonded to the first coolant manifold segment to create an enclosed coolant manifold. The liner is then bonded to the second side of the backup structure such that each of the plurality of feed channels intersects the plurality of coolant channels.

Using multiple feed channels to supply coolant to the coolant channels is superior to the discrete feed passage approach and the single feed channel approach for a variety of reasons. First, like the single feed channel approach, the fabrication costs and time associated with the multiple feed channel approach of the present invention is significantly reduced over that of the discrete feed passage approach. However, by using multiple, smaller feed channels rather than one larger channel, the present invention provides a surface between the feed channels to which the liner is bonded to, creating a more robust structure. This allows for higher bond pressures and allows for longer part life by reducing the local liner bond joint stress levels.

Additionally, since the present invention provides for multiple feed channels, and hence multiple coolant flow paths, embodiments of the present invention allow for flow redistribution in the event of a blockage in the system. If contamination were to cause a blockage somewhere in the system, the multiple coolant feed tubes and multiple feed channels continue to feed the coolant channels, preventing a coolant liner failure. Further, the multiple feed channel approach allows for increased coolant inlet and outlet flow area to the coolant channels, resulting in a reduced pressure drop than that which occurs using the discrete feed passage approach. Finally, the multiple feed channel approach of the present invention eliminates the tight tolerances and precision machining involved with the discrete feed passage approach, saving time and decreasing fabrication costs.

These and other features and advantages of the present invention will become apparent after a review of the following detailed description of the disclosed embodiments and the appended claims.

GENERAL DESCRIPTION

Figure 1A:
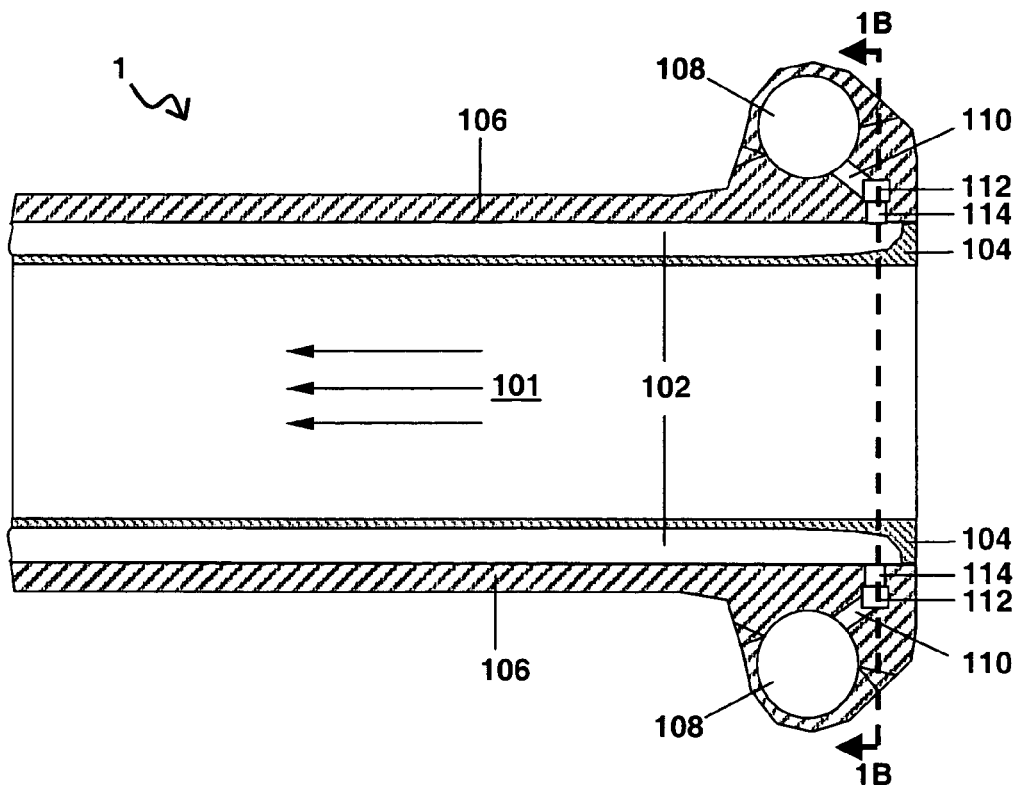
FIG. 1A is a cross-sectional view along a longitudinal axis of a typical rocket engine combustion chamber utilizing a conventional coolant system.
Figure 1B:
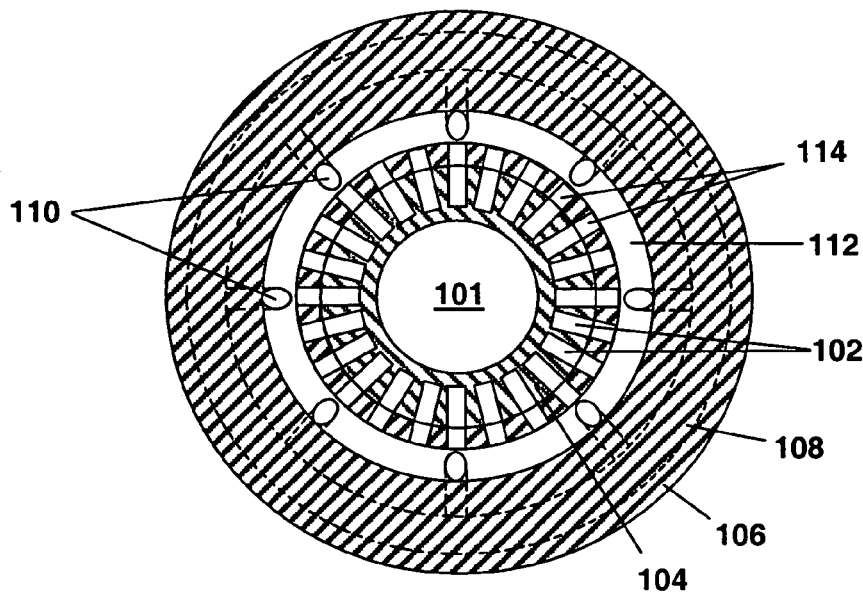
FIG. 1B is a partial cross-sectional view, along a plane identified in FIG. 1A, of a typical rocket engine combustion chamber utilizing a conventional coolant system.

The present invention is directed to a coolant system and method for fabricating a coolant system. Embodiments of the present invention may be described with reference to FIGS. 3A–4. Prior to describing embodiments of the present invention, it is helpful to describe conventional coolant system designs with reference to FIGS. 1A–2B. FIG. 1A is a cross-sectional view illustrating the discrete passage coolant channel feed approach to providing coolant to a plurality of coolant channels in a typical rocket combustion chamber application. FIG. 1B is a cross-sectional view of a typical rocket combustion chamber along an axis defined in FIG. 1A. Coolant system 1 of FIGS. 1A and 1B comprises coolant channels 102, liner 104, backup structure 106, coolant manifold 108, coolant feed tubes 110, intermediate coolant manifold 112, and discrete feed passages 114. Liner 104 contains coolant channels 102. Manifold 108 holds coolant in backup structure 106. Coolant feed tubes 110 distributes coolant from manifold 108 to intermediate manifold 112. Discrete feed passages 114 are drilled from intermediate manifold 112 to each coolant channel 102.

As hot gases pass through the combustion chamber 101, coolant flows from coolant manifold 108, through coolant feed tubes 110, to the intermediate manifold 112, to coolant channels 102 via discrete feed passages 114. Use of coolant system 1 creates several problems. First, fabrication costs can be high. As seen in FIG. 1B, the number of discrete feed passages 114 drilled is directly proportional to the number of coolant channels 102. As the number of coolant channels increases, so does the fabrication time and expense. Moreover, discrete feed passages 114 are often very small, and backup structure 106 between liner 104 and manifold 108 is often very thick. Intermediate manifold 112 is created between the primary manifold 108 and discrete feed passages 114 to reduce the length of the discrete feed passages 114 and to allow for straight-in drilling techniques. However, intermediate manifold 112 can create an undesirable overall pressure drop and necessitates additional machining and bonding steps in the fabrication cycle, further increasing fabrication cost and cycle time.

Another problem with the discrete feed passage approach arises when bonding liner 104 and backup structure 108 together. The discrete feed passages 114 and coolant channels 102 must be located with extreme precision within the liner and backup structures, and then mated together with a high degree of accuracy. The required precision of the fabrication process further increases costs and pushes capability limitations.

Yet another concern with this process involves premature failure of liner 104 due to blockages of the inlet or outlet passages of the coolant channels 102 or discrete feed passages 114. Finally, a problem arises when the application calls for closely spaced coolant channels. When the coolant channels 102 are closely spaced together, the discrete feed passage 114 diameter cannot be significantly larger than the width of coolant channel 102. As a result, the available flow area through the discrete feed passage 114 is limited. The resultant pressure drop is usually unacceptable. As a result, multiple passages must be drilled or a non-round passage must be created, either by conventional or electrical discharge machining processes, both of which increase fabrication costs considerably.

Figure 2A:
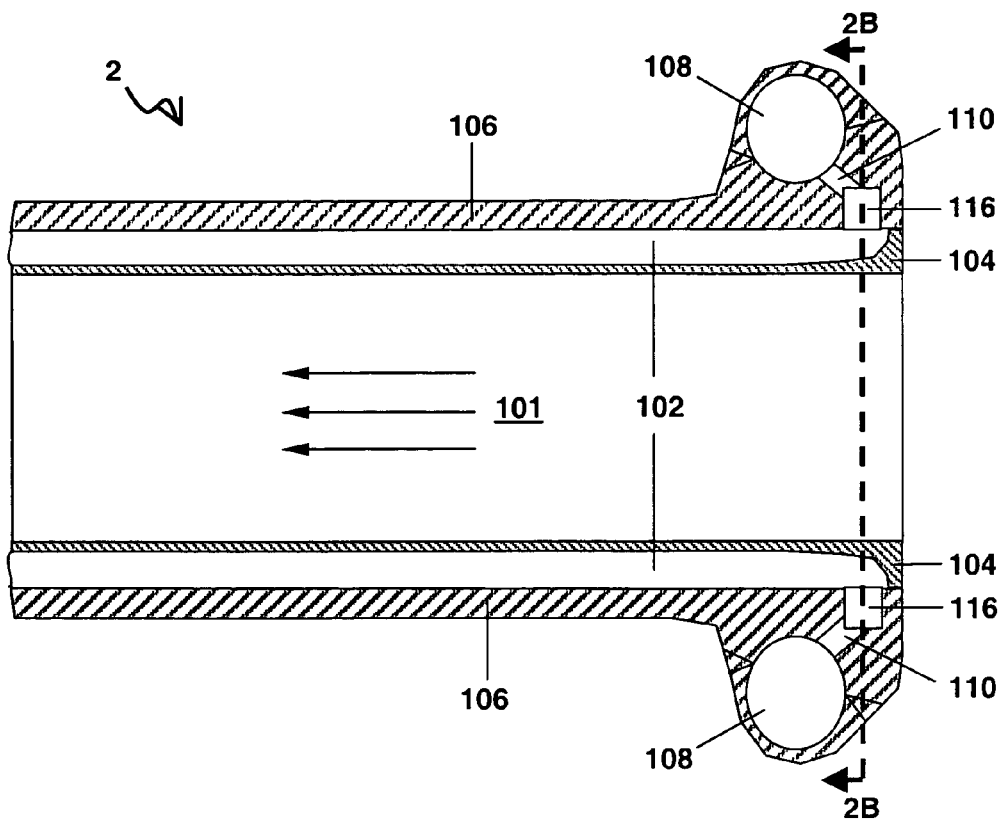
FIG. 2A is a cross-sectional view along a longitudinal axis of a typical rocket engine combustion chamber utilizing an alternative conventional coolant system.
Figure 2B:
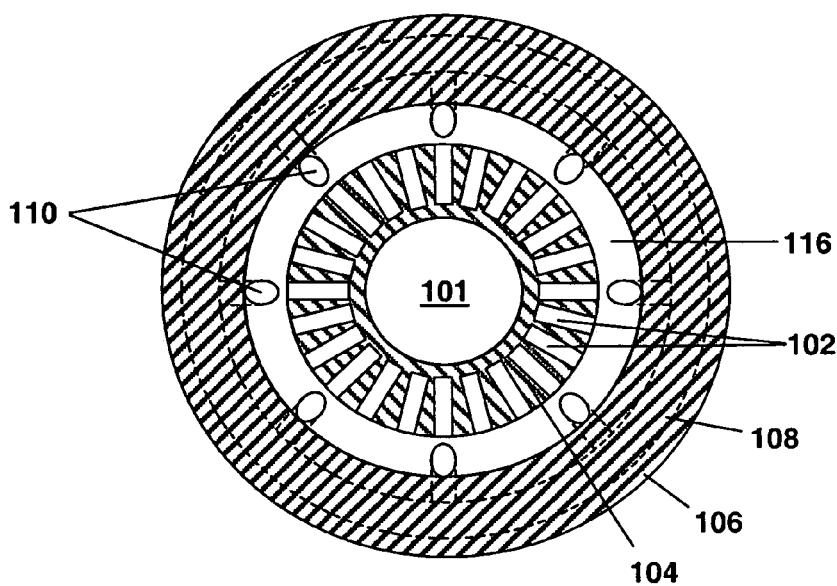
FIG. 2B is a partial cross-sectional view, along a plane identified in FIG. 2A, of a typical rocket engine combustion chamber utilizing an alternative conventional coolant system.

Another conventional method of supplying coolant to the coolant channels 102 in liner 104 is to use coolant system 2 of FIGS. 2A and 2B. Coolant system 2 comprises coolant channels 102, liner 104, backup structure 106, coolant manifold 108, coolant feed tubes 110, and single feed channel 116. Liner 104 contains coolant channels 102. Manifold 108 holds coolant in backup structure 106. Coolant feed tubes 110 distribute coolant from manifold 108 to the single feed channel 116. Single feed channel 116 intersects and distributes coolant to the plurality of coolant channels 102. This approach significantly reduces fabrication costs from the discrete feed passage approach, however, it has limited applicability. The single feed channel 116 results in a contiguous unsupported span in the liner 104 where it is unbonded to the backup structure 106. This is structurally unacceptable for many high performance cooled products. The contiguous unsupported span can limit liner life and result in significant liner deformation during the process of bonding liner 104 to backup structure 106.

The present invention is directed to a coolant system and method for fabricating a coolant system. In one embodiment of the present invention, a coolant system comprises a casing, a plurality of coolant channels, a plurality of feed channels, and a coolant manifold. Each of the plurality of feed channels intersects the plurality of coolant channels such that each feed channels supplies coolant to all of the coolant channels. In one embodiment, the plurality of feed channels are parallel to one another and intersect the coolant channels at approximately one end of the coolant channels and at approximately right angles to the coolant channels. The coolant manifold provides coolant to the feed channels through a plurality of coolant feed tubes that extend from the manifold and intersect the plurality of feed channels. Each coolant feed tube distributes coolant to all of the feed channels.

In one embodiment, the casing includes a liner and a backup structure. The liner contains the plurality of coolant channels while the backup structure contains all other components of the coolant channel feed system. The liner and backup structure are mated such that the plurality of feed channels intersects the plurality of coolant channels. In another embodiment, the liner contains a plurality of coolant channels and a top portion of a plurality of feed channels. The backup structure contains the remaining components of the coolant channel feed system as well as a bottom portion of the plurality of feed channels. The liner and backup structure are bonded such that the top portion of the plurality of feed channels in the liner and the bottom portion of the plurality of feed channels in the backup structure align.

Another embodiment of the present invention is directed to a method for fabricating a coolant channel feed system comprising manufacturing a liner that contains a plurality of coolant channels; manufacturing a backup structure that contains a first coolant manifold segment in a first side of the backup structure, a plurality of coolant feed tubes, and a plurality of feed channels in a second side of the backup structure; bonding a second coolant manifold segment to the first coolant manifold segment in the first side of the backup structure to create an enclosed coolant manifold; and bonding the liner to the second side of the backup structure such that each of the plurality of feed channels intersects the plurality of coolant channels. The plurality of coolant feed tubes are machined such that a first end of each of the plurality of coolant feed tubes opens into the first coolant manifold segment and a second end of each of the plurality of coolant feed tubes extends through the backup structure toward a second side of the backup structure. The plurality of feed channels intersect the second end of each of the coolant feed tubes such that coolant flows from the coolant manifold, through the coolant feed tubes, to the feed channels, where it is distributed throughout the coolant channels.

DETAILED DESCRIPTION

Figure 3A:
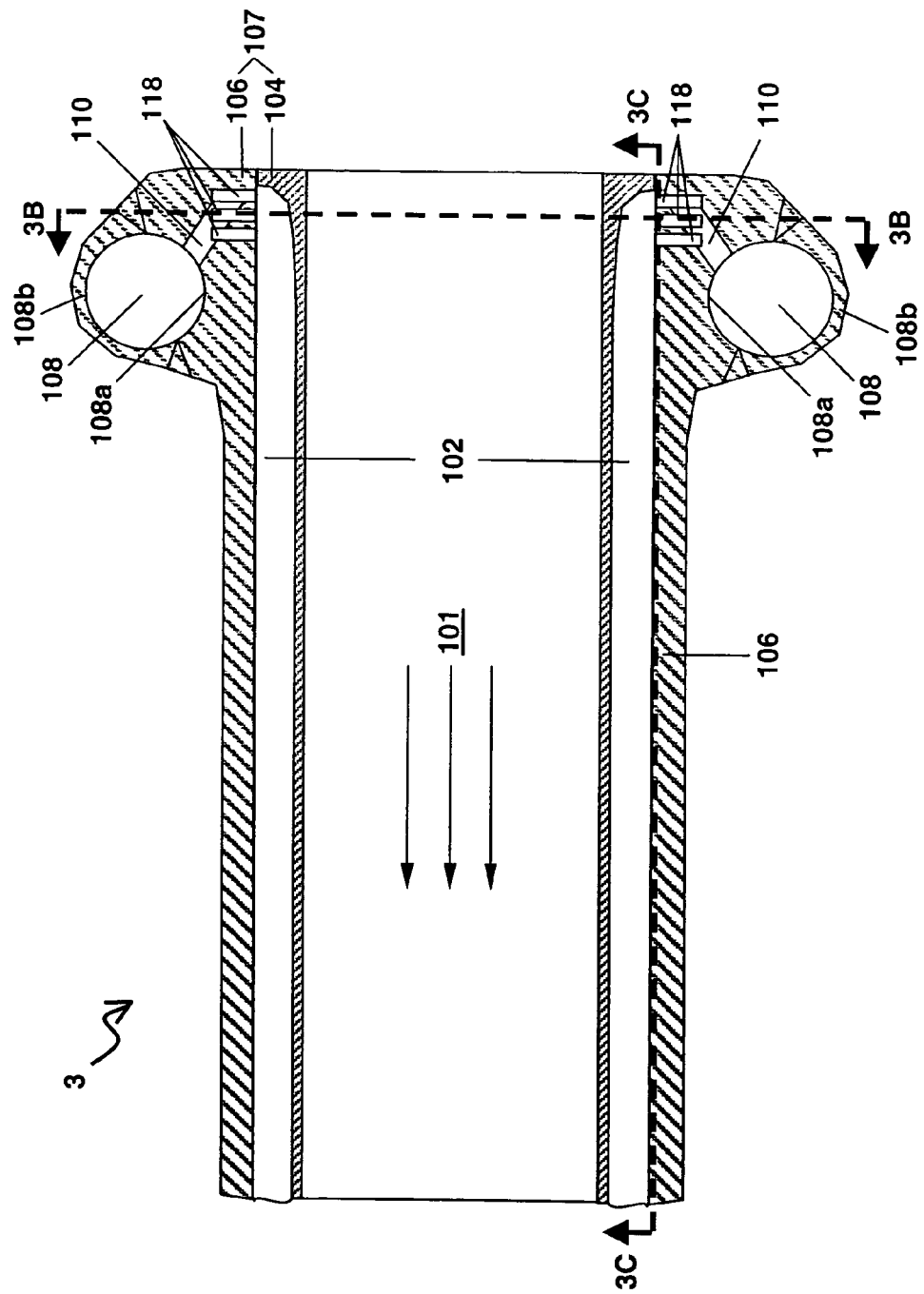
FIG. 3A is a cross-sectional view along a longitudinal axis of a typical rocket engine combustion chamber utilizing a coolant system according to one embodiment of the present invention.

Embodiments of the present invention may be described with reference to FIGS. 3A–4. FIG. 3A illustrates a cross-section of a typical rocket component 124, shown in FIG. 4., utilizing one embodiment of the present invention. FIG. 4 shows a perspective view of rocket component 124 and will be discussed in detail below with respect to one embodiment of the present invention. It is to be understood that while embodiments of the present invention are described with reference to a rocket combustion chamber, to which coolant system 3 creates a cylindrical configuration around the combustion chamber, embodiments of the present invention may be configured in any shape and used in any application where active cooling of a heated surface is desired. For example, while feed channels 118 of the present invention are represented as multiple contiguous annuli, feed channels 118 could be parallel channels with a first end and a second end, fabricated in a flat liner for an application where a relatively flat surface requires active cooling.

Referring now back to FIG. 3A, as hot gases flow through combustion chamber 101, coolant system 3 distributes coolant to coolant channels 102 in order to dissipate heat from the walls of combustion chamber 101. According to one embodiment, coolant system 3 comprises casing 107, a plurality of coolant channels 102, coolant manifold 108, and three feed channels 118. It is to be understood that casing 107 may be a multi-piece body or cast from a single piece of material. Likewise, any number of feed channels greater than one may be used in the present invention. In the preferred embodiment of the present invention, casing 107 is comprised of liner 104 and backup structure 106. Coolant manifold 108 is configured to provide coolant to the plurality of feed channels 118. One skilled in the art will appreciate that more than one coolant manifold may be used for redundancy purposes or to satisfy design requirements. In the preferred embodiment, coolant manifold 108 provides coolant to the plurality of feed channels 118 through a plurality of coolant feed tubes 110. A first end of each of the plurality of coolant feed tubes 110 extends from manifold 108 and a second end of each of the plurality of coolant feed tubes 110 intersects the plurality of feed channels 118 such that coolant flows freely from the manifold 108, through the coolant feed tubes 110, to the plurality of feed channels 118.

Figure 3B:
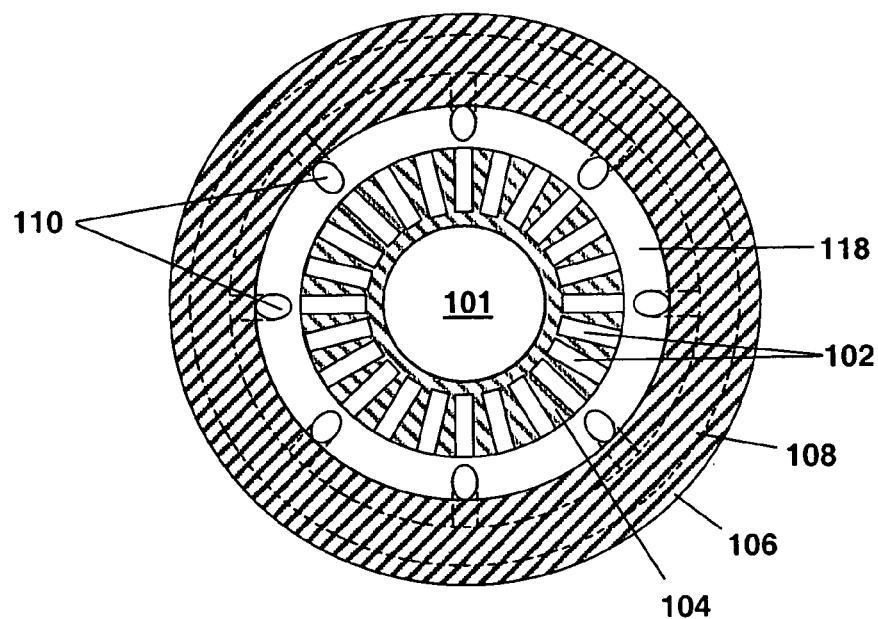
FIG. 3B is a partial cross-sectional view, along a plane identified in FIG. 3A, of a typical rocket engine combustion chamber utilizing a coolant system according to one embodiment of the present invention.
Figure 4:
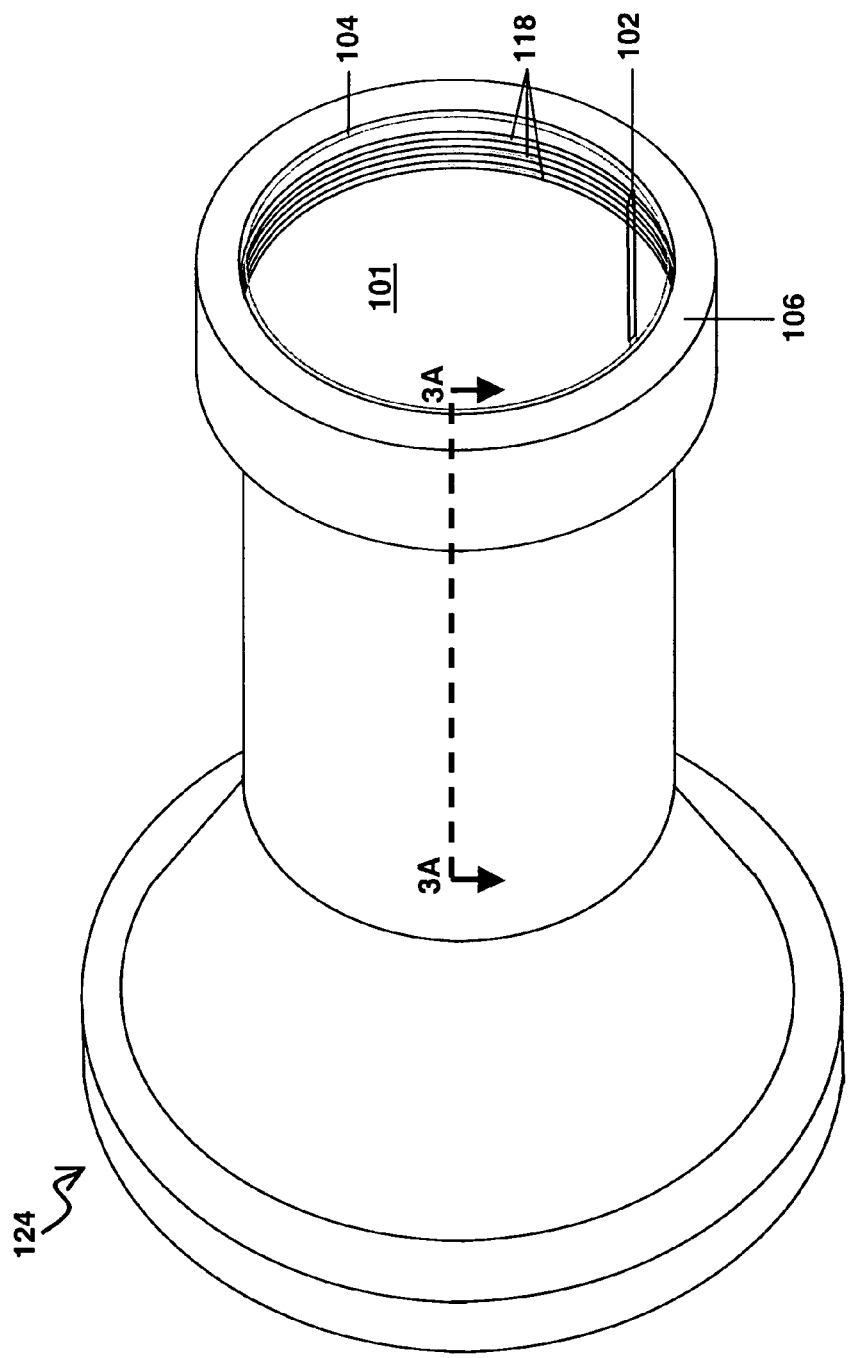
FIG. 4 is a partial perspective view of a typical rocket engine combustion chamber utilizing a coolant system according to one embodiment of the present invention.

The coolant feed tubes 110 can be seen in FIG. 3B, which shows a cross-section of a typical rocket combustion chamber along a plane identified in FIG. 3A. Hot gases flow through combustion chamber 101 (into the page) with the coolant channel feed system 3 surrounding combustion chamber 101. Coolant manifold 108 is represented in FIG. 3B by a broken line, showing that it is embedded within backup structure 106. A plurality of coolant feed tubes 110 are shown. A second end of each of the plurality of coolant feed tubes 110 is seen intersecting one of the plurality of feed channels 118. As seen in FIG. 3A, coolant feed tubes 110 also intersect the additional feed channels 118 not shown in FIG. 3B.

Each coolant feed tube 110 is represented by a broken line traveling from the second end that intersects the plurality of feed channels 118, back through backup structure 106, to the first end of each coolant feed tube that opens into coolant manifold 108. It is to be understood that the number, dimensions, locations, and spacing of coolant feed tubes 110 may vary depending on the application. Additionally, each coolant feed tube 110 of the plurality may not intersect every feed channel 118 of the plurality of feed channels. One skilled in the art will appreciate the potential benefit of having coolant feed tubes 110 distribute coolant to specific feed channels depending on the number, location, and configuration of the coolant feed tubes 110 and feed channels 118, rather than having all coolant feed tubes 110 supply all feed channels 118. Similarly, the dimensions and location of coolant manifold 108 may vary depending on the application without affecting the viability of the present invention. For example, it is contemplated that a coolant manifold or multiple coolant manifolds could supply the plurality of feed channels with coolant using a single coolant feed tube or multiple coolant feed tubes asymmetrically spaced along the multiple feed channels.

Figure 3C:
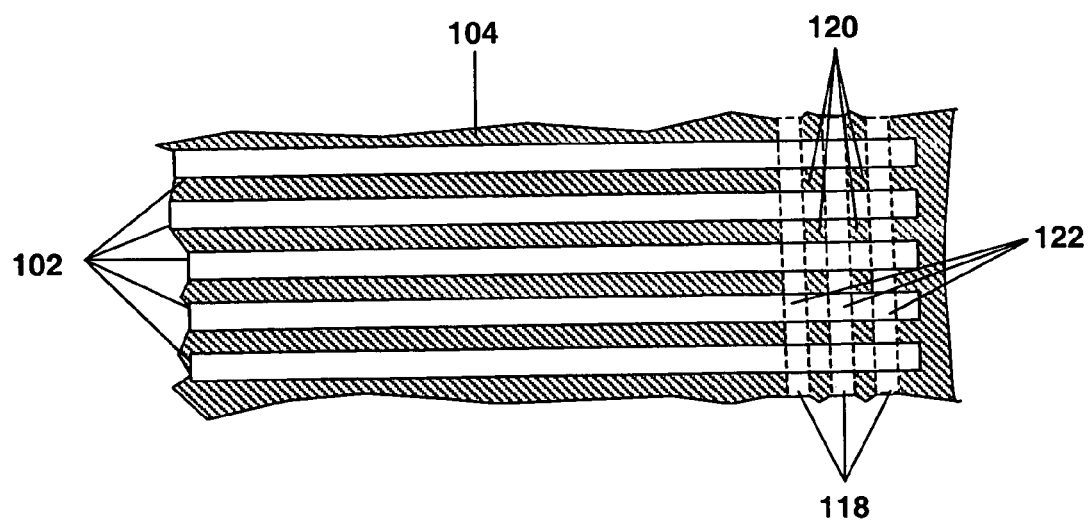
FIG. 3C is a partial cross-sectional view, along a plane identified in FIG. 3A, of a typical rocket engine combustion chamber utilizing a coolant system according to one embodiment of the present invention.

Each feed channel 118 of the plurality of feed channels intersects the plurality of coolant channels 102. FIG. 3B illustrates a feed channel 118, configured in the preferred embodiment of the present invention as a contiguous annulus, intersecting the plurality of coolant channels 102. In one embodiment, the plurality of feed channels 118 intersect the plurality of coolant channels 102 at approximately one end of the coolant channels 102 and at approximately right angles to the coolant channels 102. This configuration is shown in FIGS. 3A–3C.

One skilled in the art will appreciate that the feed channels 118 could intersect the coolant channels 102 at a midpoint in the coolant channels or at any other point along the length of the coolant channels. Likewise, each feed channel of the plurality of feed channels could intersect the plurality of coolant channels at a different location rather than being closely spaced together. Feed channels 118 could intersect coolant channels 102 at angles other than 90 degrees, allowing coolant to flow in various directions throughout the plurality of coolant channels since a single feed channel might intersect one coolant channel at one end and another parallel coolant channel at the opposite end. Feed channels 118 might also be configured such that the feed channels are not parallel as shown in FIGS. 3A and 3C. Additionally, feed channels 118 may be configured such that each feed channel intersects more than one, but not all, of the coolant channels 102.

In one embodiment of the present invention, as illustrated in FIG. 3A, coolant channels 102 are located within liner 104. Feed channels 118 and the remaining components of coolant channel feed system 3 are located within backup structure 106. Backup structure 106 is fixedly attached to liner 104 using techniques now available, such as brazing and welding, or using techniques developed in the future. Backup structure 106 and liner 104 are bonded such that the plurality of feed channels intersects the plurality of coolant channels.

In another embodiment of the present invention (not shown), a top portion of feed channels 118 are located in liner 104, while a bottom portion of feed channels 118 are located in backup structure 106 along with the remaining components of the coolant system. Using this configuration, backup structure 106 and liner 104 must be bonded in such a way that the top and bottom portions of feed channels 118 align. Independent of whether feed channels 118 are located entirely within liner 104, or partially in liner 104 and partially in backup structure 106, it is to be noted that any number of the plurality of feed channels 118 may intersect any number of the plurality of coolant channels 102 at any location and angle; although, in the preferred embodiment, each of the plurality of feed channels 118 intersects the entire plurality of coolant channels at approximately right angles and at approximately one end of the coolant channels, as shown in FIGS. 3A and 3C.

FIG. 3C is a cross-sectional view according to a plane identified in FIG. 3A. FIG. 3C illustrates the intersection of feed channels 118 with coolant channels 102. Although feed channels 118 of one embodiment of the present invention are located entirely in backup structure 106, broken lines in FIG. 3C represent the location of feed channels 118 when backup structure 106 is bonded to liner 104. According to another embodiment, these broken lines would be solid lines representing a top portion of feed channels 118 located in liner 104. Coolant inlets 122 are the intersect locations where coolant flows from feed channels 118 into coolant channels 102. As seen in FIG. 3C, multiple coolant inlets 122 prevent liner failure caused by blockages that may occur in coolant inlets 122 or in coolant channels 102.

Bond locations 120 are locations on the surface of liner 104 and backup structure 106 between feed channels 118 and coolant channels 102 that come into contact when liner 104 and backup structure 106 are bonded together. The configuration of the present invention wherein coolant channels 102 are fed by multiple feed channels 118, as opposed to the conventional, single feed channel as seen in FIG. 2A, creates bond locations 120, which allow for a more robust structure that can withstand higher bond pressures and produces lower local liner bond joint stress levels. Liner 104 and backup structure 106 are bonded together in embodiments of the present invention using brazing techniques, but may be bonded by welding, casting the structure as one integral piece, or using any technique now known or developed in the future.

FIG. 4 represents a typical rocket component 124 utilizing one embodiment of the present invention. Hot gases pass through combustion chamber 101 of rocket component 124, heating the interior walls. Backup structure 106 contains coolant manifold 108 and a plurality of coolant feed tubes 110 (not shown). Coolant feed tubes 110 distribute coolant to three feed channels 118 in liner 104. Feed channels 118 of the embodiment depicted in FIG. 4 are contiguous annuli. All three feed channels 118 feed coolant to each coolant channel 102 of a plurality of coolant channels. For clarity, only one coolant channel 102 is shown in FIG. 4. Cross-section 3A of rocket component 124 is depicted in FIG. 3A.

One embodiment of the present invention is directed to a method for fabricating a coolant system. Referring to FIG. 3A, a plurality of coolant channels 102 are manufactured into liner 104. In a preferred embodiment, liner 104 is metal, but may be any material suitable for the temperature and structural loads present in a specific application for which it is designed. Coolant channels 102 are milled into liner 104. Additionally, coolant channels 102 may be cast into the liner or fabricated using any machining method now known or developed in the future. First coolant manifold segment 108*a* is milled into a first side of backup structure 106. First coolant manifold segment 108*a* may also be cast as part of backup structure 106, or machined using any method available in the art.

A plurality of coolant feed tubes 110 are drilled from first coolant manifold segment 108*a* such that a first end of each of the plurality of coolant feed tubes 110 opens into coolant manifold segment 108*a* and a second end of each of the plurality of coolant feed tubes 110 extends through backup structure 106 toward a second side of backup structure 106. It is to be understood that the plurality of coolant feed tubes 110 may be drilled, cast into backup structure 106, or machined using electrical discharge machining techniques or created using any other method known in the art. A second coolant manifold segment 108*b* is bonded to first coolant manifold segment 108 to create enclosed coolant manifold 108. The two coolant manifold segments 108*a* and 108*b* may be bonded using brazing techniques as well as being welded or bonded using adhesives or any technique now known or developed in the future.

A plurality of feed channels 118 are milled into the second side of backup structure 106 such that the plurality of feed channels 118 intersect the second end of each of the plurality of coolant feed tubes 110. It is to be understood that the number, location, and configuration of the coolant feed tubes 110 and feed channels 118 may be varied depending on the design requirements of the specific application. For example, half of the plurality of coolant feed tubes 110 could distribute coolant to half of the plurality of feed channels 118 as opposed to all coolant feed tubes 110 intersecting and feeding all feed channels 118. Additionally, feed channels may be fabricated using any method now known or developed in the future to include casting the channels into the backup structure, or using milling or lathing techniques.

Finally, liner 104 and backup structure 106 are bonded together such that the plurality of feed channels 118 intersect the plurality of coolant channels 102. The bonding may be accomplished using brazing techniques as well as welding, adhesives, or any other techniques known in the art. In the preferred embodiment shown in FIG. 3A, all of the plurality of feed channels 118 intersect all of the plurality of coolant channels 102 at approximately right angles and at approximately one end of the coolant channels 102. Again, one skilled in the art will appreciate that any number of the plurality of feed channels 118 could intersect any number of the plurality of coolant channels 102 at any location and angle depending on the desired characteristics of the coolant system.

While the invention has been particularly shown and described with reference to preferred embodiments thereof, it will be understood by those skilled in the art that various other changes in the form and details maybe made therein without departing from the spirit and scope of the invention. The foregoing description of the exemplary embodiments of the invention has been presented for purposes of illustration and description. It is not intended to be exhaustive or to limit the invention to the precise form disclosed. Many modifications and variations are possible in light of the above teaching. It is intended that the scope of the invention be limited not with this detailed description but rather by the claims appended hereto.

I claim:

1. A coolant system comprising:
    a coolant system casing for housing at least the following components:
        a plurality of coolant channels;
        a plurality of feed channels; and
        a first coolant manifold
    wherein each of the plurality of feed channels intersects at least a first coolant channel and a second coolant channel, and wherein each of the plurality of coolant channels receives coolant from at least a first feed channel and a second feed channel; and
    wherein the first coolant manifold is configured to provide coolant to the plurality of feed channels.

2. The coolant system of claim 1 wherein each of the plurality of feed channels intersects each of the plurality of coolant channels such that each coolant channel of the plurality of coolant channels is fed by each feed channel of the plurality of feed channels.

3. The coolant system of claim 1 further comprising a plurality of feed tubes, wherein a first end of each of the plurality of coolant feed tubes extends from the first coolant manifold and a second end of each of the plurality of coolant feed tubes intersects at least a first feed channel and a second feed channel of the plurality of feed channels such that coolant flows freely from the first coolant manifold, through the coolant feed tubes, to the plurality of feed channels.

4. The coolant system of claim 3 wherein the second end of each of the plurality of coolant feed tubes intersects each of the plurality of feed channels.

5. The coolant system of claim 1 wherein the plurality of feed channels are parallel to each other, and wherein each of the plurality of feed channels intersects the plurality of coolant channels at approximately one end of the coolant channels and at approximately right angles to the coolant channels.

6. The coolant system of claim 1 wherein the coolant system casing comprises:
    a liner, wherein the liner contains the plurality of coolant channels and a top portion of the feed channels; and
    a backup structure, wherein the backup structure contains a bottom portion of the feed channels and all other components comprising a coolant channel feed system, and wherein the backup structure is fixedly attached to the liner such that the top and bottom portions of the feed channels align.

7. The coolant system of claim 6 wherein the backup structure is brazed to the liner.

8. The coolant system of claim 1 wherein the coolant system casing comprises:
    a liner, wherein the liner contains the plurality of coolant channels; and
    a backup structure, which contains the feed channels and all other components comprising a coolant channel feed system, and wherein the backup structure is fixedly attached to the liner such that each of the plurality of feed channels intersects the plurality of coolant channels at approximately one end of the coolant channels, and at approximately right angles to the coolant channels.

9. A coolant system comprising:
    a coolant system casing comprising a liner and a backup structure bonded together;
    a plurality of coolant channels within the coolant system casing;
    a plurality of feed channels, wherein each of the plurality of feed channels intersects at least a first coolant channel and a second coolant channel, and wherein each of the plurality of coolant channels receives coolant from at least a first feed channel and a second feed channel;
    at least a first coolant manifold; and
    a plurality of coolant feed tubes, wherein a first end of each of the plurality of coolant feed tubes extends from the coolant manifold and a second end of each of the plurality of coolant feed tubes intersects at least a first feed channel and a second feed channel of the plurality of feed channels such that coolant flows freely from the manifold, through the coolant feed tubes, to the plurality of feed channels.

10. The coolant system of claim 9 wherein each of the plurality of feed channels intersects each of the plurality of coolant channels such that each coolant channel of the plurality of coolant channels is fed by each feed channel of the plurality of feed channels, and wherein the second end of each of the plurality of coolant feed tubes intersects each of the plurality of feed channels.

11. The coolant system of claim 9 wherein the plurality of feed channels are parallel and each of the plurality of feed channels intersects the plurality of coolant channels at approximately one end of the coolant channels and at approximately right angles to the coolant channels.

12. The coolant system of claim 9 wherein the liner contains the plurality of coolant channels and the backup structure contains the plurality of feed channels, the first coolant manifold and the plurality of coolant feed tubes, and wherein the backup structure is fixedly attached to the liner such that each of the plurality of feed channels intersects the plurality of coolant channels at approximately one end of the coolant channels, and at approximately right angles to the coolant channels.

13. The coolant system of claim 9 wherein the liner contains the coolant channels and a top portion of the plurality of feed channels, and the backup structure contains a bottom portion of the plurality of feed channels the first coolant manifold and the plurality of coolant feed tubes, and wherein the backup structure is fixedly attached to the liner such that the top and bottom portions of the feed channels align.

14. A method for fabricating a coolant system comprising:
    manufacturing a plurality of coolant channels into a liner;
    manufacturing a first coolant manifold segment in a first side of a backup structure;
    manufacturing a plurality of coolant feed tubes, wherein a first end of each of the plurality of coolant feed tubes opens into the first coolant manifold segment and a second end of each of the plurality of coolant feed tubes extends through the backup structure toward a second side of the backup structure;

bonding a second coolant manifold segment to the first manifold segment to create an enclosed coolant manifold;

manufacturing a plurality of feed channels into the second side of the backup structure, wherein the plurality of feed channels intersect the second end of each of the plurality of coolant feed tubes; and bonding the liner to the backup structure such that each of the plurality of feed channels intersects at least a first coolant channel and a second coolant channel of the plurality of coolant channels.

15. The method for fabricating a coolant system of claim 14 wherein the plurality of coolant channels and the plurality of feed channels are manufactured by milling the channels in the liner and backup structure respectively.

16. The method for fabricating a coolant system of claim 14 wherein each of the plurality of feed channels intersects the plurality of coolant channels at approximately one end of the coolant channels, and at approximately right angles to the coolant channels.

17. The method for fabricating a coolant system of claim 14 wherein the plurality of coolant feed tubes are manufactured through electrical discharge machining.

18. The method for fabricating a coolant system of claim 14 wherein the bonding of the liner to the backup structure comprises brazing the components together.

19. The method for fabricating a coolant system of claim 14 wherein manufacturing the plurality of coolant feed tubes and the plurality of feed channels comprises casting the coolant feed tubes and feed channels.

20. The method for fabricating a coolant system of claim 14 wherein manufacturing a first coolant manifold segment in a first side of a backup structure comprises casting the coolant manifold segment.

* * * * *